United States Patent
Bailey et al.

[11] Patent Number: 5,876,539
[45] Date of Patent: Mar. 2, 1999

[54] FABRICATION OF FERRITE TOROIDS

[75] Inventors: Alex E. Bailey, Hampstead; John Chino, Arnold; Dennis Grube, Ellicott City; Andrea Curbean, Baltimore; Tapan Gupta, Ellicott City; Ronnie L. Starling, Columbia, all of Md.

[73] Assignee: Northrop Grumman Corporaiton, Los Angeles, Calif.

[21] Appl. No.: 877,379

[22] Filed: Jun. 17, 1997

[51] Int. Cl.⁶ .............................. B32B 31/26; H01P 1/195
[52] U.S. Cl. .................... 156/89.16; 156/89.28; 156/256; 156/267; 156/268; 333/1.1; 333/24.1
[58] Field of Search ............................ 156/89.12, 89.16, 156/89.28, 256, 267, 268; 333/1.1, 24.1

*Primary Examiner*—Curtis Mayes
*Attorney, Agent, or Firm*—Walter G. Sutcliff

[57] ABSTRACT

A method of fabricating ferrite toroids used in ferrite phase shifters. The method employs fabrication techniques found in low temperature cofired ceramics (LTCC) tape technology and involves fabricating long rectangular through-holes, as is required by the toroid design, in layers of green ceramic tape and maintaining the integrity of the through-holes during a firing process wherein ferromagnetic ceramic oxide in the tape is converted to ferrite.

13 Claims, 4 Drawing Sheets

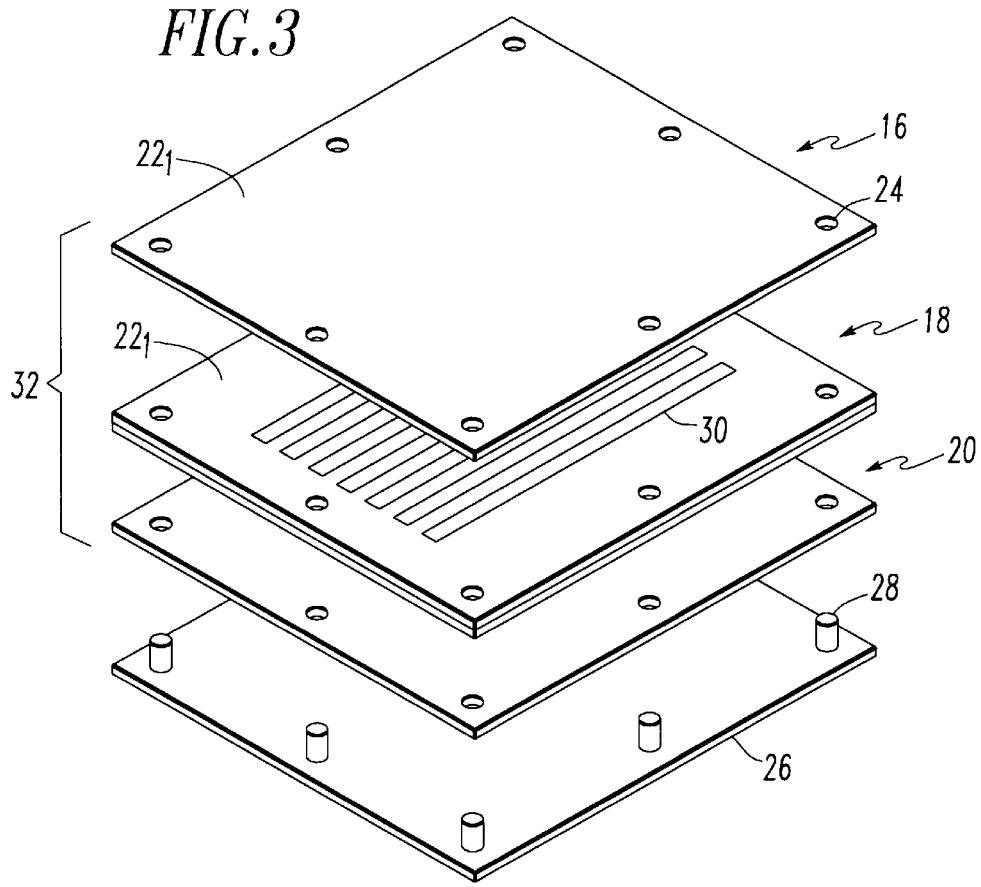
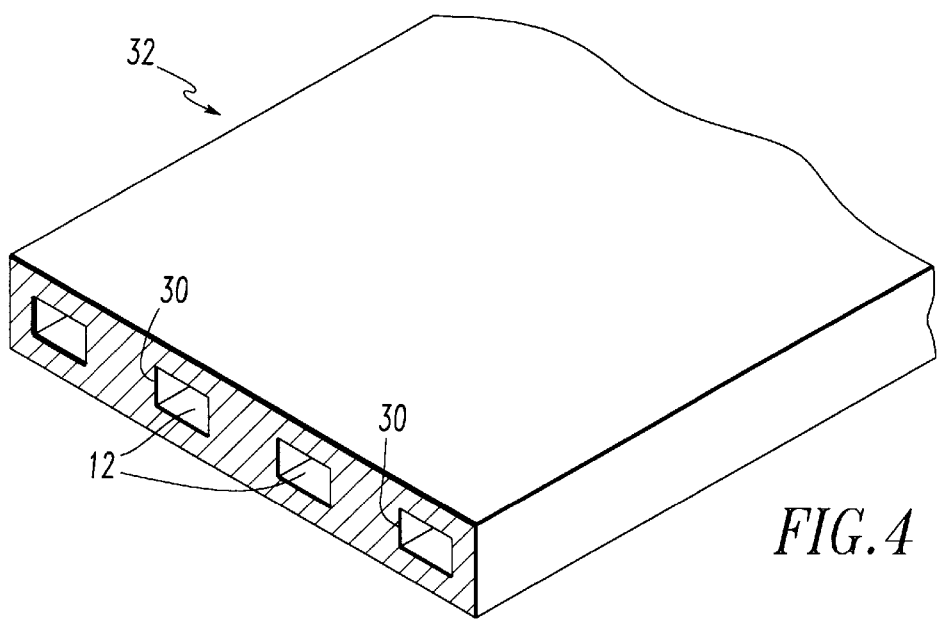

FABRICATION OF FERRITE TOROIDS

BACKGROUND OF THE INVENTION

1. Field of the Invention

This invention relates generally to ferrite phase shifters and their method of fabrication and more particularly to a method of fabricating ferrite toroids for phase shifters using low temperature cofired ceramic (LTCC) tape technology.

2. Description of the Prior Art

Ferrite phase shifters are well known devices in which the phase of an electromagnetic wave of a given frequency propagating through a transmission line can be altered. Such devices have been extensively used in radar applications for electronic beam steering and phased array application. Two types of electronic phase shifters are currently utilized for modern phased array antenna systems, namely, ferrite phase shifters and solid state semiconductor phase shifters. Ferrite phase shifters generally fall into two categories: toroid phase shifters enclosed within a waveguide structure, and phase shifters built using transmission line microstrip configurations.

The most costly item in the fabrication of toroid ferrite phase shifters is the fabrication of ferromagnetic toroids which typically involves powder processing, sintering and expensive machining using precision diamond cutting and grinding tools.

A typical fabrication technique for producing a ferrite toroid is as follows. Oxide raw materials are first ground and wet-mixed in a ball mill lined with rubber or plastic to prevent contamination. An appropriate amount of organic binder system, solvent and water are next added during the mixing process of the powder to form a slurry which is then subjected to spray drying. The solvents are then evaporated from the atomized liquid droplets and spherical powders of the mixture of oxides and binders are formed in a spray-drying chamber. Finally, the powders are collected, poured into dyes, pressed into shape and sintered.

Another approach is to mix the ceramic, binder, plasticizer and solvent in such a way that the mixture becomes a plastic which can then be extruded in the form of bars and rods of various dimensions, after which they are dried and fired.

The firing temperature of ferrite varies between 1100° C. and 1500° C. and requires a precise firing schedule and oxygen partial pressure to carefully control the chemical valance state of the ferrite compounds. During firing, the oxides react with each other to form what is commonly known as ferrite.

Redimensioning and reshaping of fired ferrite devices to make square holes through the length of the structure and to maintain close tolerances are the most important and most expensive steps in the fabrication of ferrite toroids and are typically accomplished by cutting and grinding using diamond blades. Tooling and labor costs in this latter phase of fabrication are relatively high.

Summary

Accordingly, it is an object of the present invention to provide an improved method for fabricating ferrite toroids.

It is another object to provide an innovative fabrication technique for making ferrite toroids that is simpler, more economical, and manufacturing-friendly.

It is a further object of the invention to provide an improved method of fabricating ferrite toroids using LTCC technology, thereby facilitating multilayering and metal printing, which comprise operations which are not available in fabrication processes according to the known prior art.

It is yet another object of the invention to provide an improved method of fabrication of ferrite toroids which eliminates relatively expensive machining operations.

The foregoing and other objects of the invention are achieved by a method of forming ferrite toroids, comprising the steps of: forming core, top, and bottom laminates of plural layers of green ceramic oxide tape; forming elongated slots in the core laminate; placing the core laminate between the top and bottom laminates; subjecting the three laminates to isostatic or uniaxial pressure in a laminating fixture to form a toroid sheet; trimming off end and side portions of the toroid sheet including any tooling holes; firing the toroid sheet to form a toroid sheet of ferrite; repeating the foregoing steps to produce a second toroid sheet—of ferrite; bonding a dielectric sheet between the two ferrite toroid sheets to provide a dual toroid ferrite sheet; plating the top and bottom surfaces of the dual toroid ferrite sheet with metallization; forming elongated parallel grooves in the metallized sheet to provide a plurality of elongated toroid pairs; plating the grooves so as to cover all of the exposed side walls of the toroid pairs with metallization in a second metallization step; and finally, dicing and cutting the grooved ferrite sheet to provide a plurality of discrete metallized toroid pairs of a predetermined length.

Further scope of applicability of the present invention will become apparent from the detailed description provided hereinafter. However, it should be understood that the detailed description and specific examples, while indicating the preferred method of the invention, are provided by way of illustration only, since various changes, alterations and modifications coming within the spirit and scope of the invention will become readily apparent to those skilled in the art.

BRIEF DESCRIPTION OF THE DRAWINGS

The present invention will become more fully understood from the detailed description of the invention provided hereinbelow and the accompanying figures which are provided by way of illustration only, and thus are not limitative of the present invention, and wherein:

FIGS. 1–9 are perspective views illustrative of the fabrication steps utilized in accordance with the preferred method of forming ferrite toroids for use in phase shifter devices.

DETAILED DESCRIPTION OF THE INVENTION

Figure 9A:
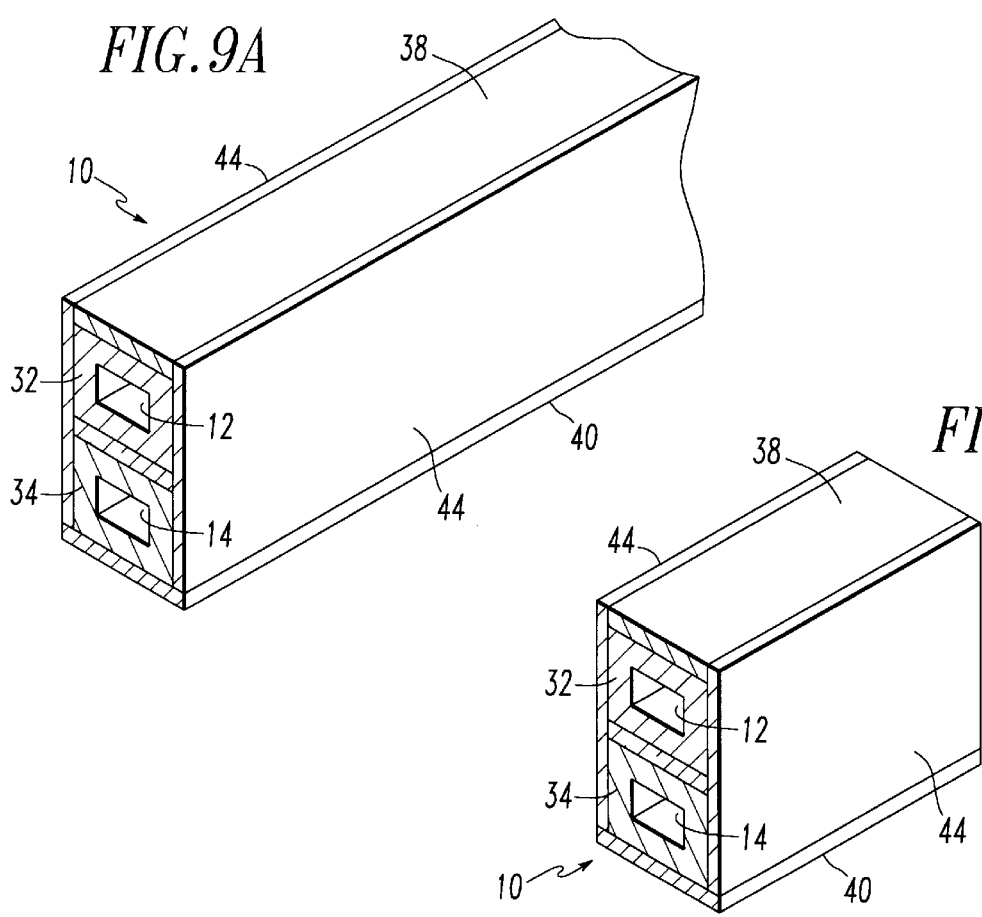
Figure 9B:
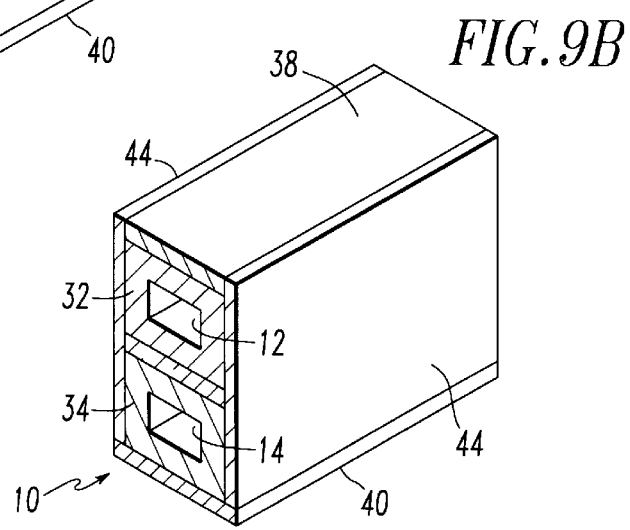

The present invention starts with selectively cut layers of green tape of ceramic oxides, which when subjected to firing temperatures turns into ferrite and from which a toroid pair 10 such as shown in FIGS. 9A and 9B and including a pair of through-holes 12 and 14, will result from a fabrication process now to be described.

Figure 1A:
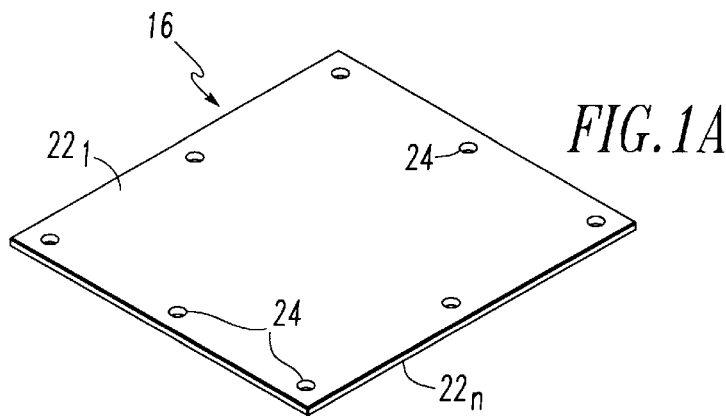
Figure 1B:
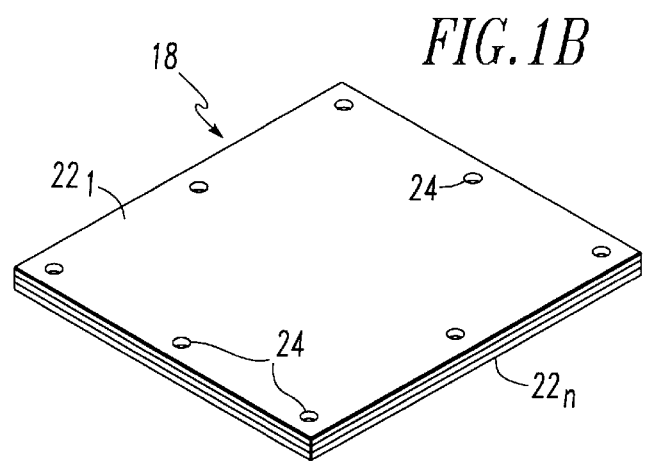
Figure 1C:
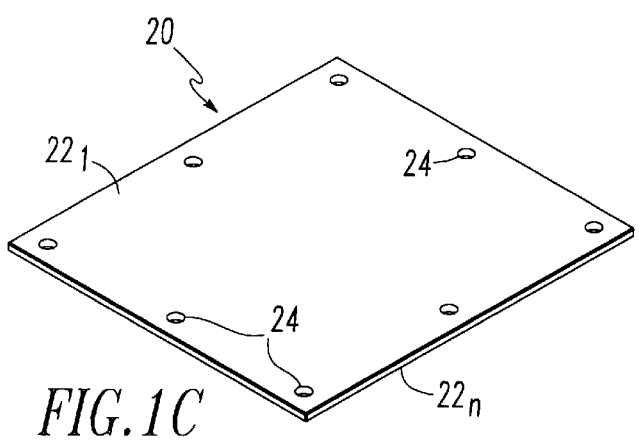

The preferred method starts with three building locks as shown in FIGS. 1A, 1B and 1C, and which respectively depict a top laminate 16, a core laminate 18 and a bottom laminate 20. Each of the laminates 16, 18 and 20 are made by prelaminating a selected number of layers $22_1 \ldots 22_n$ of green ferrite tape as determined by the particular toroid design required as well as compatibility of that design with isostatic processing of laminates. All of the tape layers $22_1 \ldots 22_n$ contain the same pattern of tooling holes 24 for ease of lay up and precision alignment when assembled together on an assembly plate 26 as shown in FIG. 3, including a set of alignment pins 28 corresponding to the hole pattern of the holes 24 formed in the layers $22_1 \ldots 22_n$.

Figure 2:
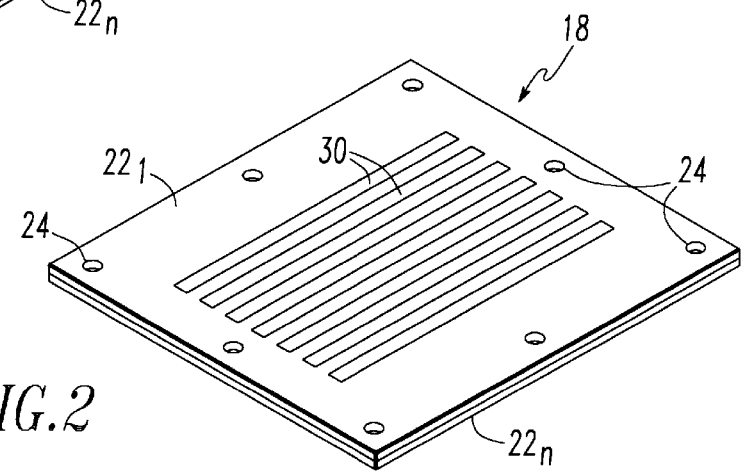

As shown in FIG. 2, a plurality of elongated parallel slots or cavities 30 having predetermined dimensions and substantially flat side walls are then drilled or routed in the core laminate 18.

Next, the core laminate 18 is placed between the top and bottom laminates 16 and 20 and assembled on the plate 26 as shown in FIG. 3, using the tooling holes 24, and the matching alignment pins 28. Following this, the assembly is then placed in a laminating fixture, not shown, and subjected to isostatic or uniaxial pressing. It is possible that in some instances a thin spray or binder system may be required to enhance the adhesion between the laminates 16, 18 and 20. Pressure is applied in such a way that the three laminates 16, 18 and 20 are well-pressed into a toroid sheet structure 32 (FIG. 4) without any delamination, shape distortion, collapsing or buckling of the slots 30, which will result in the formation of the through-holes 12 and 14 having a rectangular cross section as shown in FIGS. 9A and 9B. Optimization of pressure, temperature and hold-time of isostatic lamination is the most important aspect of the subject process and comprises a pressure of 3000 psi, a temperature of 720° C., and a hold-time of 15 minutes.

After the toroid sheet 32 is formed, the tooling holes 24 (FIG. 3) in the ends are removed as shown in FIG. 4 such as by routing and is fired using a standard filing profile to obtain a toroid sheet 32 of ferrite, and wherein the slots 30 are now transformed into a corresponding number of rectangular through-holes 12.

Figure 5:
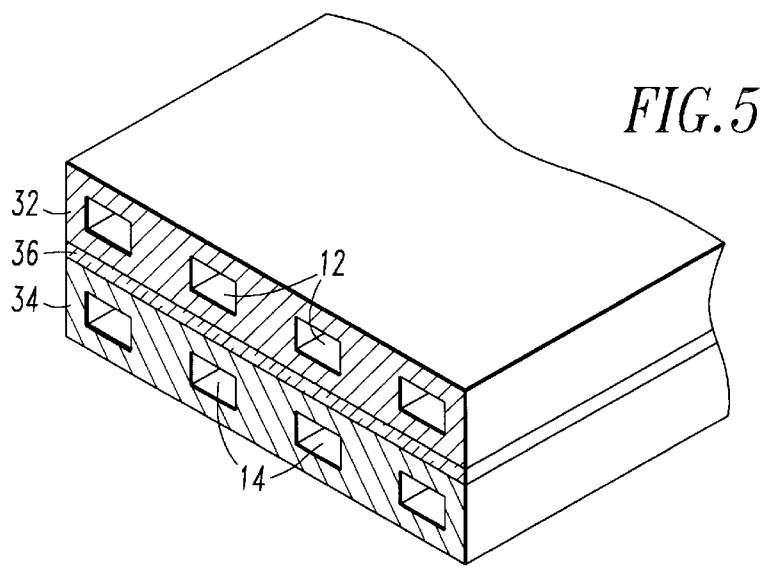

Following this, a second ferrite toroid sheet 34 is formed in the same manner as that of the ferrite toroid sheet 32 and having the same number of through-holes 14 as that of the sheet 32. The two ferrite toroid sheets 32 and 34 are brought together with a sheet of dielectric material 36 being placed therebetween as shown in FIG. 5, and the three members are then bonded together.

Figure 6:
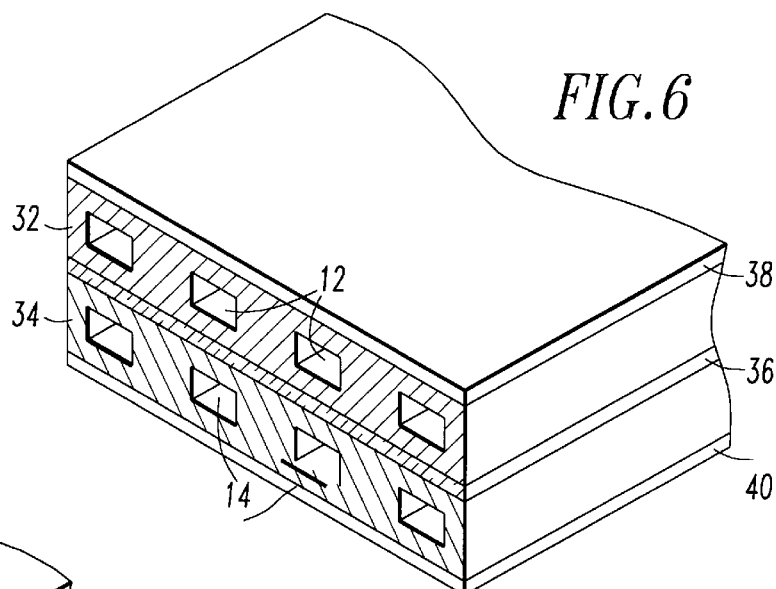
Figure 7:
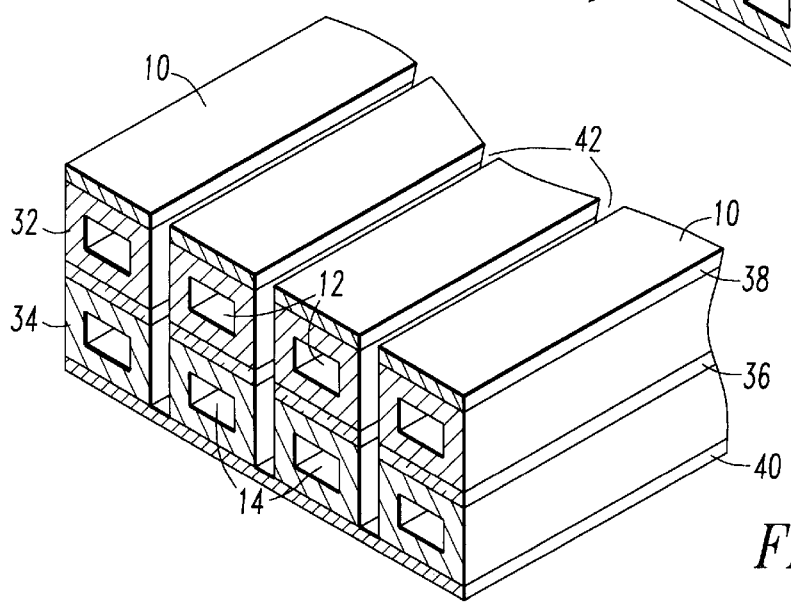
Figure 8:
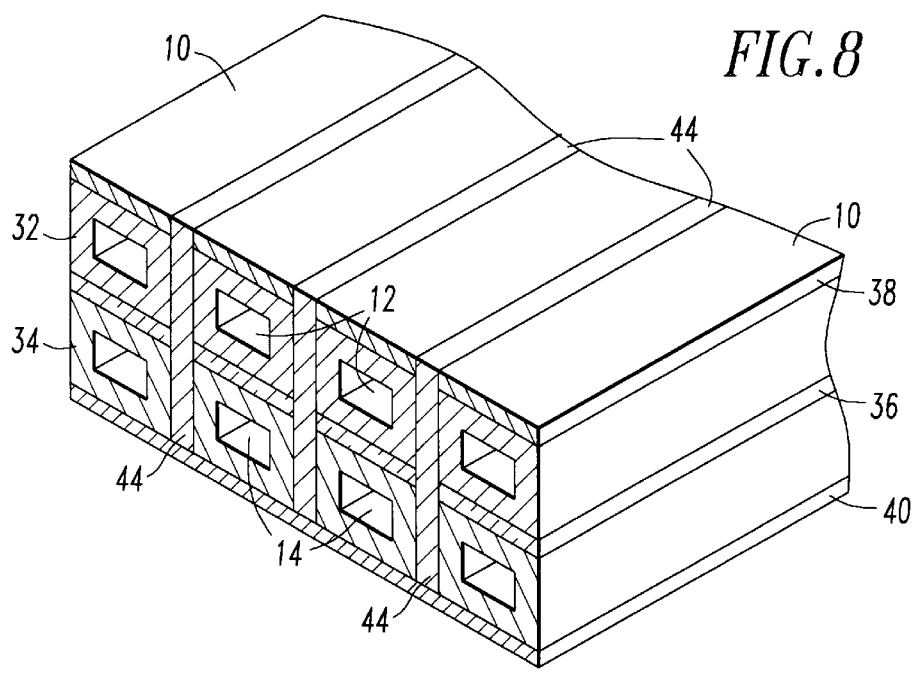

Next as shown in FIG. 6, the top and bottom surfaces of the composite structure are plated with layers of metallization 38 and 40 which are comprised of, for example, copper. Then as shown in FIG. 7, the composite structure is sliced in a longitudinal direction resulting in the formation of a plurality of elongated parallel grooves 42 so as to provide a plurality of connected ferrite toroid pairs 10 as shown in FIG. 7. At this point, a second plating step is performed as shown in FIG. 8 to cover the exposed sides of the dual toroids 10 with layers of metallization, e.g. copper, as shown by reference numeral 44 in FIG. 8.

Finally, toroid pairs 10 are separated from each other as shown in FIG. 9A and cut to a desired length as shown in FIG. 9B.

Depending upon the dimension of the toroid sheets 32 and 34, any number of toroid pairs 10 can be constructed. Such a fabrication process substantially reduces cost, since in the traditional fabrication method of a toroid, each pair is built individually, thus making each part very expensive. A fabrication method as disclosed herein will allow for a cost reduction by an order of magnitude not presently attainable.

Having thus shown and described what is at present considered to be the preferred method of this invention, it should be noted that the same has been made by way of illustration and not limitation. Accordingly, all modifications, alterations and changes coming within the spirit and scope of the invention as set forth in the appended claims are herein meant to be included.

We claim:
1. A method of forming a ferrite toroid, comprising the steps of:
(a) prelaminating plural layers of green ceramic oxide tape to form top, core and bottom laminates;
(b) forming elongated slots in the core laminate;
(c) placing the core laminate between the top and bottom laminates;
(d) laminating the top, core and bottom laminates to form a toroid sheet;
(e) firing the toroid sheet to form a toroid sheet of ferrite;
(f) repeating the foregoing steps (a)–(e) to produce a second toroid sheet of ferrite;
(g) bonding a dielectric sheet between the two ferrite toroid sheets to provide a dual toroid ferrite sheet;
(h) forming elongated parallel grooves in the dual toroid ferrite sheet to provide a plurality of elongated toroid pairs;
(i) metallizing selected external surfaces of the dual toroid ferrite sheet;
(j) cutting the grooved dual toroid sheet so as to produce a plurality of discrete toroid pairs; and
wherein the foregoing steps (a)–(j) are not necessarily performed consecutively.

2. A method in accordance with claim 1 wherein said laminating step (d) comprises subjecting the top, core and bottom laminates to isostatic or uniaxial pressurization.

3. A method in accordance with claim 1 and additionally including a step of,
(k) removing selected portions of the toroid sheet to provide a toroid sheet devoid of any tooling holes.

4. A method in accordance with claim 1 and additionally including the step of,
(k) trimming off end and side portions of the toroid sheet to remove tooling holes.

5. A method in accordance with claim 4 wherein said trimming step (k) is performed prior to the firing step (e).

6. A method in accordance with claim 1 wherein said metallizing step (i) includes metallizing the top and bottom surfaces of the dual toroid sheet.

7. A method in accordance with claim 1 wherein said metallizing step (i) includes metallizing the grooves in the toroid sheet and the external side walls of the dual toroid sheet.

8. A method in accordance with claim 1 wherein said metallizing step (i) includes the steps of,
(I) metallizing the top and bottom surfaces of the dual toroid sheet, and
(II) metallizing the grooves in the toroid sheet and the external side walls of the dual toroid sheet.

9. A method according to claim 1 wherein said cutting step (j) comprises cutting the dual toroid sheet along the parallel grooves.

10. A method according to claim 9 wherein said cutting step (j) includes cutting the discrete toroid pairs to a selected length.

11. A method of forming a ferrite toroid, comprising the steps of:
(a) prelaminating plural layers of green ceramic oxide tape to form top, core and bottom laminates;
(b) forming elongated slots in the core laminate;
(c) placing the core laminate between the top and bottom laminates;
(d) laminating the top, core and bottom laminates by pressurization in a laminating fixture to form a laminated toroid sheet;

(e) removing selected portions of the toroid sheet to provide a toroid sheet devoid of any tooling holes;

(f) firing the toroid sheet to form a toroid sheet of ferrite;

(g) repeating the foregoing steps (a)–(f) to produce a second toroid sheet of ferrite;

(h) bonding a dielectric sheet between the two ferrite toroid sheets to provide a dual toroid ferrite sheet;

(i) metallizing the top and bottom surfaces of the dual toroid ferrite sheet;

(j) forming elongated parallel grooves in the dual toroid ferrite sheet to provide a plurality of elongated toroid pairs;

(k) metallizing the grooves and the side walls of the dual toroid ferrite sheet; and (l) cutting the grooved dual toroid ferrite sheet into a plurality of discrete metallized toroid pairs.

12. A method in accordance with claim 11 wherein said step (d) of laminating includes exerting isostatic or uniaxial pressure on the laminates.

13. A method in accordance with claim 11 wherein said steps (a)–(l) are performed consecutively.

* * * * *